United States Patent [19]

Parker et al.

[11] Patent Number: 5,741,927
[45] Date of Patent: Apr. 21, 1998

[54] SEPARATION PROCESS

[75] Inventors: David Parker, Great Ayton; John Arthur Turner, Normanby; Ian Peter Milne, Stockton-on-Tees, all of United Kingdom

[73] Assignee: Imperial Chemical Industries PLC, Great Britain

[21] Appl. No.: 492,064

[22] PCT Filed: Feb. 9, 1994

[86] PCT No.: PCT/GB94/00248

§ 371 Date: Jul. 21, 1995

§ 102(e) Date: Jul. 21, 1995

[87] PCT Pub. No.: WO94/19082

PCT Pub. Date: Sep. 1, 1994

[30] Foreign Application Priority Data

Feb. 17, 1993 [GB] United Kingdom ............ 9303191

[51] Int. Cl.⁶ .................................................. C07C 51/42
[52] U.S. Cl. .................................................. 562/486
[58] Field of Search .................................................. 562/486

[56] References Cited

U.S. PATENT DOCUMENTS 2,815,288 12/1957 Mckay .

FOREIGN PATENT DOCUMENTS

A 0 498 591  8/1992  European Pat. Off. .
WO A 88
 05766      8/1988  WIPO .

Primary Examiner—Samuel Barts

[57] ABSTRACT

A process for the purification of terephthalic acid is disclosed. A slurry containing crystals in an impurity-containing mother liquor under elevated pressure and temperature conditions is processed to separate the crystals from the mother liquor. The processing comprises highly efficient separation and washing of the crystals under the elevated temperature and pressure conditions in a unit (32) to produce a mass of crystals having a low level of contamination. The washed crystals are reslurried in aqueous medium (vessel 40) and transferred to a secondary separation unit (34) operating under lower pressure and temperature conditions, the transfer being effected by flashing down (in vessel 44) to the lower pressure. The filtrate (41) from unit (34), and optionally wash liquor used in unit (34), is used to establish a recirculating flow whereby the aqueous medium used for reslurrying the crystals prior to pressure let-down is repeatedly re-used.

11 Claims, 2 Drawing Sheets

SEPARATION PROCESS

This application is a 371 of PCT/GB94/00248 filed Feb. 9, 1994.

FIELD OF THE INVENTION

This invention relates to a separation process, particularly for use in the separation of crystals from a slurry thereof in a mother liquor essentially comprising an impurity-containing solvent from which the crystals have been precipitated in the course of a crystallisation process carried out at elevated pressure.

BACKGROUND OF THE INVENTION

One application of the present invention is in the separation of terephthalic acid crystals from an aqueous mother liquor following the purification of crude terephthalic acid by contacting an aqueous solution thereof with a source of hydrogen under reducing conditions. The purification process may of the type well known in the art; EP-A-498591 for instance may be referred to for details of one such process.

In EP-A-498591, it is recognised that conservation of water used in the purification process is desirable and EP-A-498591 teaches how this may be achieved. The present invention addresses more specific ways in which conservation of water (or other solvent) may be achieved in separation processes involving the separation of crystals from mother liquors especially in circumstances where the slurry of crystals in mother liquor arises under elevated pressure conditions.

SUMMARY OF THE INVENTION

According to the present invention there is provided a process for the separation of crystals from a slurry thereof with an impurity-containing mother liquor, said process comprising:

(a) in an elevated pressure and temperature zone subjecting the slurry to a primary separation process to produce a mass containing said crystals and residual mother liquor;

(b) in said elevated pressure and temperature zone washing said mass with a wash liquor to reduce the residual mother liquor content of said mass;

(c) under said elevated pressure and temperature conditions slurrying the washed mass in an aqueous medium and transferring the slurry to a lower pressure zone;

(d) in said lower pressure zone, subjecting the slurry of step (c) to a secondary separation process to recover the crystals and also the aqueous medium employed in step (c);

(e) establishing a recirculating flow of said recovered aqueous medium between step (d) and step (c) whereby said recovered aqueous medium is repeatedly used in step (c).

Preferably the aqueous medium used in step (c) is at a lower temperature than the temperature prevailing in said elevated pressure and temperature zone. This eliminates the need to re-heat the aqueous medium to a temperature corresponding to the temperature residing in said elevated pressure and temperature zone. Thus, for example, prior to transfer to the lower pressure zone, the aqueous medium used in step (c) my be at a temperature which is at least 20° C., more preferably at least 50° C., below the temperature prevailing in the elevated pressure zone. However, we do not exclude the possibility of re-heating the aqueous medium to a temperature intermediate the temperatures prevailing in the recirculating flow and in the elevated pressure zone respectively.

According to a particularly preferred feature of the present invention, the primary separation of step (a) and the wash of step (b) are carried out using an integrated separation and washing process such as can be achieved using a belt filter apparatus or pressure drum filter apparatus. Because the separation and washing can be carried out with high efficiency by means of such apparatus, a low level of contamination can be maintained in the recirculating flow of aqueous medium used to reslurry the crystals for transfer from the elevated pressure zone to the lower pressure zone.

The level of contamination in the recirculating flow is conveniently maintained within desired, predetermined limits by taking a purge from the recirculating flow and introducing fresh aqueous medium into the flow.

Where, in step (c), the washed crystals are reslurried using relatively cold aqueous medium, the aqueous medium is conveniently combined with the washed crystals in a vessel in which a pressurised blanket of inert gas such as nitrogen is established.

Preferably the transfer from said elevated pressure and temperature zone to the lower pressure and temperature zone is effected by means of a flash vessel in which flashing off of aqueous medium occurs, the aqueous medium flashed off in this way advantageously being reintroduced into said recirculating flow at a suitable location.

The secondary separation may be followed by a washing stage in which the crystals are washed with added aqueous medium which thereafter enters said recirculating flow.

In one embodiment of the invention part of the recirculating flow may be diverted and used in washing said mass in step (b) or it may be used in a process upstream of step (b) which results in the production of the slurry supplied to step (a).

The process according to the invention typically forms part of a process for the purification of crude terephthalic acid such as that described in EP-A-498591 and PCT-A-GB93/01019, the entire contents of both applications being incorporated herein by reference.

Preferably the wash liquor employed in step (b) is used at least in part as solvent in forming the aqueous solution of crude terephthalic acid to be purified.

The purification process may be a conventional process involving contacting the aqueous solution of crude terephthalic acid with a source of hydrogen under reducing conditions. However, we do not exclude the possibility of a two stage purification process involving initially treating the aqueous solution of crude terephthalic acid under oxidising conditions in order to convert at least part of the 4-carboxybenzlaldehyde (4-CBA) impurity to terephthalic acid, followed by contacting the aqueous solution with a source of hydrogen under reducing conditions in order to convert any residual 4-CBA to para-toluic acid while converting colour impurities to forms which be can removed subsequently or can be tolerated in the end product.

The crude terephthalic acid may be derived from the liquid phase oxidation of para-xylene by means of a process such as that described in EP-A-502628, the entire contents of which are also incorporated herein. Alternatively, the crude terephthalic acid may be derived from other sources, for example crude terephthalic acid recovered from scrap polyethylene tetraphthalate by means of a process such as that described in our prior EP-A-550979.

Other features and aspects of the invention will become apparent from the following brief description of the drawings, description and the appended claims.

BRIEF DESCRIPTION OF THE DRAWINGS

The invention will now be described by way of example only with reference to the accompanying drawings, in which.

DETAILED DESCRIPTION

Figure 1:
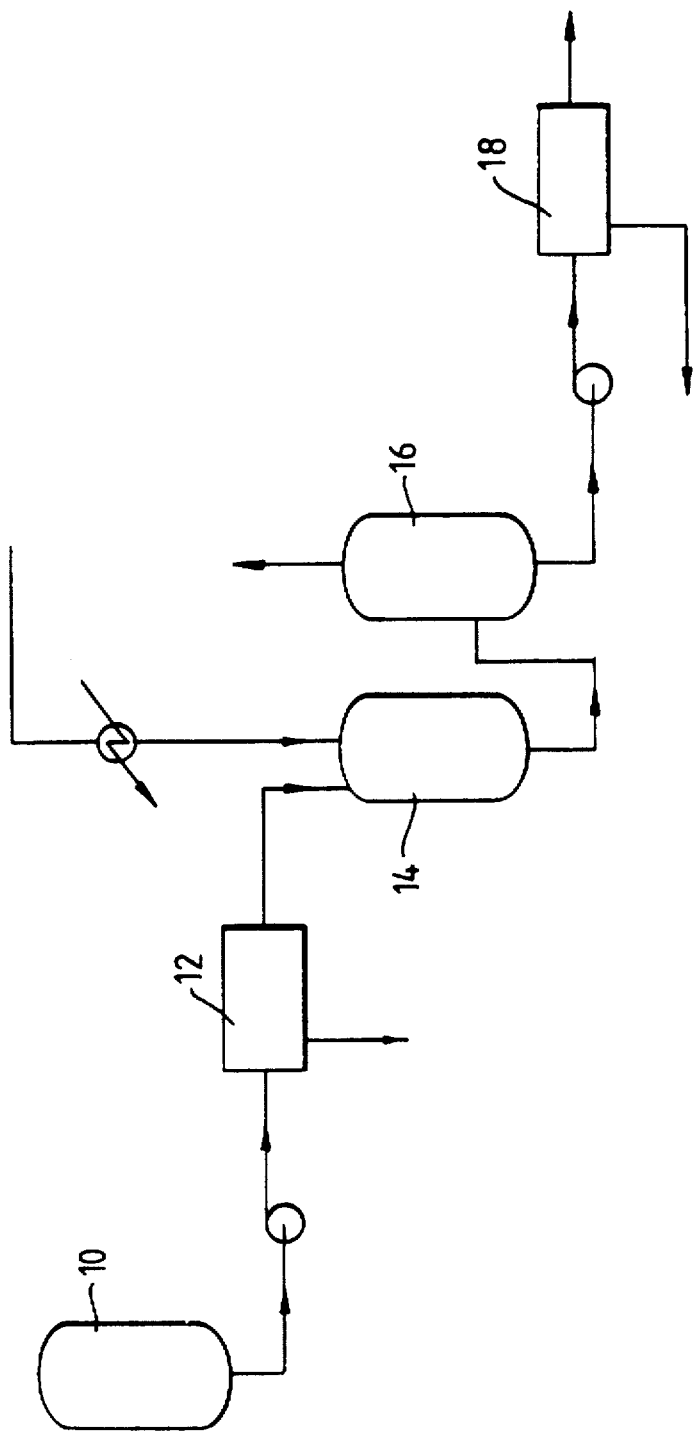
FIG. 1 illustrates conventional plant for effecting solid/liquid separation of a slurry of terephthalic acid following purification.

The present invention may be embodied in a process for the production of terephthalic acid as disclosed in our prior EP-A-498591. Before describing embodiments of the present invention however, to put it in context, there follows a description, with reference to FIG. 1, of plant representative of a typical prior art approach to the separation of terephthalic acid from a slurry thereof followed by washing and deliquoring. The slurry is derived from a purification process in which an aqueous solution of crude terephthalic acid is treated with hydrogen in the presence of a Group VIII catalyst in order to reduce the level of contaminants, such as 4-carboxybenzylaldehyde and colour impurities. The treated solution is then subjected to a crystallisation process involving a series of crystallisation stages at different temperatures and pressures, the final stage typically being at a temperature and pressure of the order of 152° and 5 bara respectively.

The resulting slurry of terephthalic acid crystals in aqueous mother liquor is then passed from the last crystalliser vessel 10 to a primary separation unit 12 usually at substantially the same temperature and pressure as the final crystallisation stage. In the first separation unit, a simple solid/liquid separation is carried out, for example by means of a centrifuge, to produce a cake typically having a moisture content of the order of 10% by weight. This moisture content is constituted by residual mother liquor and will therefore have an impurity concentration corresponding to that of the mother liquor present in the slurry delivered to the separation unit.

The separated terephthalic acid product is then conventionally processed further by reslurrying it in fresh solvent (water), which serves to dilute the impurities present, the reslurry being effected in reslurry vessel 14 at the same temperature as the primary separation. The reslurry process is carried out at elevated pressure and the resulting slurry is delivered to a flash stage 16 which results in the slurry being let-down to atmospheric pressure. The slurry is then delivered to a secondary separation unit 18 where the terephthalic acid crystals are separated from the solvent by means of centrifuges or rotary filters. The filtrates recovered at this stage may be recovered and reused, for instance to reslurry and dissolve further incoming crude terephthalic acid to be purified.

Figure 2:
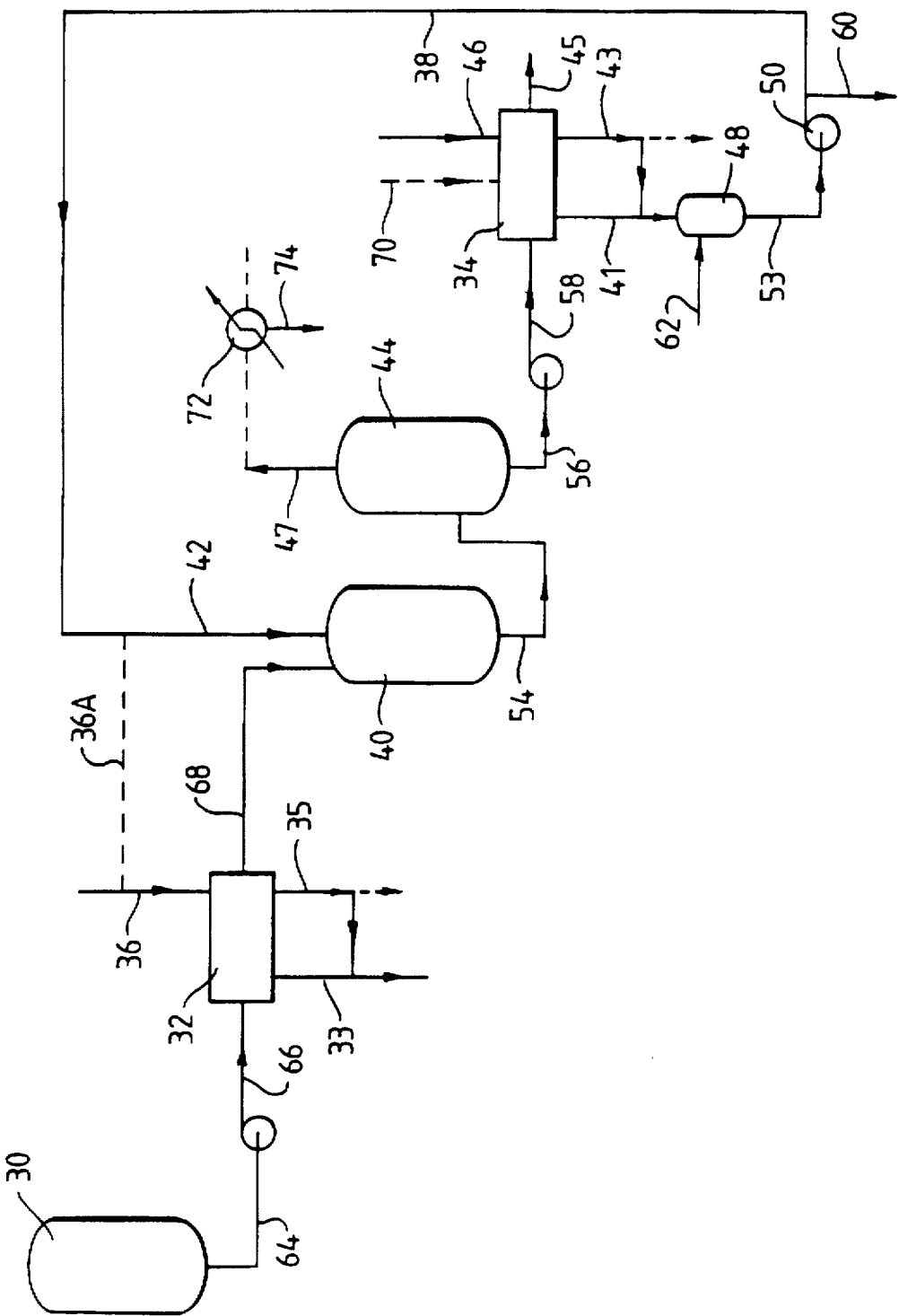
FIG. 2 illustrates plant in accordance with the present invention for carrying out the separation.

Referring now to FIG. 2, in accordance with one embodiment of the present invention, the slurry resulting from the purification process is delivered from the holding vessel 30 (which may be the last crystalliser vessel) to a primary separation unit 32 in which the slurry is subjected to filtration and washing at elevated pressure and temperature (typically 8 bara and 170° C.), preferably using equipment in which filtration and washing processes are integrated within a single device. Various devices having this capability are commercially available, for instance belt filters (such as a Pannevis filter as described for example in Filtration & Separation, March/April 1979, Page 176 et seq), drum filters, screen bowl centrifuges or solid bowl centrifuges with enhancements (such as special wash distribution channels), outfitted for achieving the above duty. Wash liquor is delivered to the primary separation unit via line 36. In the case of a belt filter for example, the slurry is discharged on to the upper run of a driven endless belt of filter medium within a sealed housing pressurised with an inert gas or vapour (for instance, steam—as disclosed in our prior PCT-A-GB93/01019). The deposited slurry is transported through a first zone in which mother liquor is drawn through the filter medium to produce, with the aid of a pressure differential developed by suction trays located beneath the upper run, a filter cake comprising terephthalic acid crystals.

The resulting filter cake, which has a moisture content comprising residual mother liquor, is transported through a second zone in which wash liquor is discharged on to the filter cake. The wash liquor, again with the aid of the pressure differential, is displaced through the filter cake and the filter medium to reduce the mother liquor content of the filter cake. The second zone may comprise a number of successive stages in which the wash liquor is applied either in parallel or serial fashion; in the latter case, it may be used in countercurrent fashion such that, with the exception of the first wash stage, the wash liquor applied in each stage is derived from the preceding washing stage. The use of integrated filtration and washing equipment such as a Pannevis filter allows extremely effective reduction in soluble impurities to be achieved, typically in excess of 99% removal of soluble impurity expressed as a proportion of the soluble impurity in the original mother liquor.

The filtrates recovered from the primary separation unit 32 comprise mother liquor (line 33) and wash liquor (line 35). The mother liquor may be treated to precipitate further terephthalic acid crystals which, because of co-precipitation of impurities such as para-toluic acid, will tend to be less pure than those crystallised prior to the primary separation. These less pure crystals may be recycled to the oxidation reactor as disclosed in our copending EP-A-498591. The remaining mother liquor is conveniently used, with or without pre-treatment for instance to reduce its para-toluic content, for reslurrying incoming terephthalic acid to be purified for instance in combination with water derived from elsewhere (as disclosed in EP-A-498591). The liltrate derived from the washing stage(s) may be combined with the mother liquor obtained from the initial filtration of the slurry or it may be used in other parts of the overall process.

The filtered and washed terephthalic acid crystals obtained from the primary separation unit 32 contains moisture of a much reduced impurity level compared with the feed slurry delivered to the unit 32. At this point, the elevated temperature and pressure conditions associated with the primary separation unit still prevail. The crystals are now transferred to the low pressure side of the plant. In the embodiment of FIG. 2, this is effected by reslurrying the crystals in reslurry vessel 40 using solvent recycled from the low pressure side via lines 38 and 42. In contrast with conventional practice, this reslurry stage is carried out using recycled solvent (although we do not exclude the possibility of using a minor proportion of fresh solvent in the reslurry stage).

The recycled solvent used for this purpose may be heated so that it is at substantially the same temperature as the terephthalic acid product obtained from the primary separation unit thereby avoiding condensation within the high pressure system and hence a drop in pressure. However heating of the recycled solvent to substantially the same temperature as the terephthalic acid crystals is preferably eliminated by maintaining a pressurised inert gas blanket within the reslurry vessel 40 in order to reduce or substantially eliminate such condensation by ensuring that the vapour pressure of the resulting slurry is not lower than the system pressure, ie the pressure prevailing upstream of the reslurry vessel 40. In this way, it is possible to use relatively cold water (typically at a temperature of about 90° C. compared with a temperature in excess of 170° C. prevailing in the primary separation unit 32) to reslurry the washed crystals.

The resulting slurry produced in vessel 40 is next flashed down to a lower pressure in flash vessel 44 for convenience of recovery using secondary separation equipment suitable for low pressure operation, water flashed off as steam being removed via line 47. The flash down which takes place in the vessel 44 may be to the same pressure (eg 1 bara/100° C. for water) as the upstream (slurry) side of the separation unit 34. However, to avoid flashing of liquors in the feed applied to the filter medium (eg a filter belt) of the separation unit 34, the feed may be cooled below the boiling point at the pressure on the downstream (filtrate) side of the filter medium (eg 0.75 bara). This may be achieved by injecting cold water into the slurry feed to the unit 34 in order to effect quenching.

Alternatively, the slurry may with advantage be flashed down in vessel 44 to a pressure (eg 0.75 bara) corresponding to, or lower than, that on the downstream side of the separation unit 34 in order to eliminate or at least substantially reduce flashing across the filter medium of the separation unit 34. In this event, the upstream side of the separation unit 34 may be pressurised eg to 1 bara using a gaseous medium supplied to the unit via line 70. The pressurising medium for this purpose is conveniently the vapour phase form of the solvent in which the crystals are slurried, ie steam. The steam may be derived from any convenient source, eg steam vented from the flash vessel 44 or steam vented from a drier downstream of the separation unit 34 and the arrangement should desirably be such that the partial pressure of the steam on the downstream side of the filter medium is substantially at or above the vapour pressure of the water component of the slurry fed to the upstream side of the filter medium. As disclosed in our prior PCT-A-GB93/01019, the use of steam as a pressurising medium in this manner allows substantially isothermal conditions to be established across the filter medium of the separation unit 34 so that the filter cake is not chilled significantly, if at all, during the filtration process.

Where the separation unit is pressurised in this way, the flash load imposed on the vessel 44 is increased but the resulting steam may be condensed in condensing system 72 and the condensate recovered via line 74 for further use in the process, eg it may be recycled for use in dissolving crude terephthalic acid upstream of the hydrogenation process.

The secondary separation unit 34 may be of any of the types previously referred to, ie belt filter, drum filter etc, having capability for filtering, washing and deliquoring the terephthalic acid crystals. In the secondary separation unit, washing of the crystals may be single stage or multi-stage (possibly in counter-current fashion) and serves to reduce the level of surface impurities that may be present on the crystals. The terephthalic acid crystals recovered from the secondary separation are removed via line 45 and delivered to suitable drying equipment such as a rotary drier or fluidised bed drier.

Washing in the secondary separation unit 34 is carried out using clean water supplied via line 46. The clean water may be fresh demineralised water or it may comprise clean water recycled from elsewhere in the overall process (as disclosed in EP-A-498591). The filtrates obtained comprise water recovered from the slurry supplied from vessel 40 (line 41) and water used in the washing stage or stages (line 43). At least one of these flitrates, conveniently both, is recycled upstream for use as reslurry liquor in the vessel 40. Thus, as shown in FIG. 2, both filtrates are collected in a common filtrate receiver 48 where they are mixed with make-up water before being recycled by pump 50 and lines 38, 42 to the vessel 40.

From the foregoing, it will be seen that the plant shown in FIG. 2 is operated with a recirculation loop, comprising lines 41 and/or 43, 53, 38, 42, vessel 40, line 54, vessel 44, lines 56 and 58, and the separation unit 34. The water circulating this loop (the "clean" loop) is used primarily for effecting reslurry of the washed terephthalic acid crystals delivered to the vessel 40 and the level of contaminants present in this loop can be maintained within acceptable limits by extracting a purge via line 60 and by supplying fresh make-up water via the wash liquor line 46 and for instance a make-up line 62 downstream of the separation unit 34. The fresh make-up water may comprise demineralised water and/or water recycled from elsewhere in the process after suitable treatment (as disclosed in EP-A-498591). Make-up water is also supplied to replace water lost as a result of flashing operations which occur on pressure let-down and water tapped off for supply via line 36A to the primary separation unit 32 where applicable, as referred to below.

Part of the solvent (essentially water) may be diverted from the clean loop and fed via line 36A for use in the primary separation unit 32, eg as wash liquor. Prior to introduction into the primary unit, it is heated at least to a temperature which is substantially the same as the feed slurry but less than the temperature at which it would boil at the separation temperature. Where part of the clean loop is diverted in this manner, the diverted water then forms part of a second recirculation loop (the "dirty" loop) comprising vessel 30, lines 64, 66, the primary separation unit 32, lines 33 and/or 35, and completed by supply of the filtrate(s) from the primary separation unit 32 for reslurry of the crude terephthalic acid to be purified and crystallised prior to delivery to the holding vessel 30. The liquor circulating the second loop carries a substantially higher level of contamination than that circulating the first loop. The "interface" between the two loops is constituted by the line 68 via which terephthalic acid recovered in the primary separation unit 32 is passed into the reslurry vessel which forms part of the first recirculation loop. However, the terephthalic acid entering the first loop via this route has a relatively low level of contamination as a result of being subjected to an efficient separation and washing process. Typically the rate of supply of wash liquor to the primary and secondary separation units is substantially the same both when the link via line 36A is present and when it is absent.

By affecting washing using equipment capable of integrating the filtration of the terephthalic acid from the slurry with a highly efficient washing process, and by employing a relatively clean water recirculation loop for the reslurrying operation carried out in vessel 40, it is possible to operate the overall separation process (comprising the primary and secondary units) with a substantial economy in water usage. This, in turn, leads to a reduction in effluent loading and subsequent treatment processes.

In the embodiment of FIG. 2, following separation of the crystals from the reslurry solvent, they are washed, However, this is not essential since the terephthalic acid product may be sufficiently pure at this stage. In this event, the washing process may be omitted and the amount of make-up water necessary may be introduced into the "clean" loop at a suitable location such as via line 62. Where the washing process is used, make-up water may still be supplied at any suitable location, eg line 62. The steam flashed off via, line 47 is also conveniently re-introduced into the clean loop at a suitable location, eg via line 62.

In another modification of the embodiment of FIG. 2, in addition to, or instead of, supplying liquid diverted from the "clean" loop to the primary separation unit 32 as a wash liquor, at least part of such diverted liquid may be supplied indirectly to the primary separation unit. Thus, for instance, the diverted liquid (or part thereof) may be used in slurrying and dissolving crude terephthalic acid prior to the purification process. The diverted liquid then passes to the primary separation unit 32 via the vessel 30 and lines 64 and 66. In this instance therefore, the diverted liquid (or part thereof) may be combined with the mother liquor and/or wash liquor discharged from the primary separation unit via lines 33 and/or 35.

What we claim is:

1. A process for the purification of terephthalic acid comprising producing an aqueous solution of crude terephthalic acid, treating the same with hydrogen under reducing conditions at elevated pressure and temperature, subjecting the treated solution to a controlled crystallization process and separating the purified terephthalic acid from the aqueous mother liquor while under elevated temperature and pressure, wherein the separation comprises the following steps:
   (a) in an elevated pressure and temperature zone subjecting the slurry to a primary separation process to produce a mass containing said crystals and residual mother liquor;
   (b) in said elevated pressure and temperature zone washing said mass with a wash liquor to reduce the residual mother liquor content of said mass;
   (c) under said elevated pressure and temperature conditions slurrying the washed mass in an aqueous medium and transferring the slurry to a lower pressure zone;
   (d) in said lower pressure zone, subjecting the slurry of step (c) to a secondary separation process to recover the crystals and also the aqueous medium employed in step (c); and
   (e) establishing a recirculating flow of said recovered aqueous medium between step (d) and step (c) whereby said recovered aqueous medium is repeatedly used in step (c).

2. A process as claimed in claim 1 in which the aqueous medium used in step (c) is at a lower temperature than the temperature prevailing in said elevated pressure and temperature zone.

3. A process as claimed in claim 2 in which the aqueous medium used in step (c) is combined with the washed crystals in a vessel in which a pressurised gas blanket is established.

4. A process as claimed in any one of claims 1 to 3 in which the transfer from said elevated pressure and temperature zone to the lower pressure and temperature zone is effected by means of a flash vessel in which flashing off of aqueous medium occurs.

5. A process as claimed in claim 4 in which the aqueous medium flashed off in said transfer is reintroduced into said recirculating flow.

6. A process as claimed in any one of claims 1 to 3 in which the primary separation and washing steps are carried out using filter belt apparatus.

7. A process as claimed in any one of claims 1 to 3 in which the primary separation and washing steps are carried out using rotary filter drum apparatus.

8. A process as claimed in any one of claims 1 to 3 in which part of said recovered aqueous medium is diverted from said recirculating flow to step (b) to effect washing of said mass of crystals.

9. A process as claimed in any one of claims 1 to 3 in which part of said recovered aqueous medium is diverted from said recirculating flow to a process upstream of step (a) which results in the production of said slurry of crystals in mother liquor.

10. A process as claimed in any one of claims 1 to 3 in which the secondary separation is followed by a washing stage in which the crystals are washed with added aqueous medium which thereafter enters said recirculating flow.

11. A process as claimed in any one of claims 1 to 3 in which the primary and/or the secondary separation process is effected while pressurising the slurry feed side with steam.

* * * * *